US008861329B2

(12) United States Patent
Imamura et al.

(10) Patent No.: US 8,861,329 B2
(45) Date of Patent: *Oct. 14, 2014

(54) INTEGRATED CIRCUIT FOR RANDOM ACCESS METHOD AND APPARATUS

(71) Applicant: Optis Wireless Technology, LLC, Plano, TX (US)

(72) Inventors: Daichi Imamura, Kanagawa (JP); Sadaki Futagi, Ishikawa (JP); Atsushi Matsumoto, Ishikawa (JP); Takashi Iwai, Ishikawa (JP); Tomofumi Takata, Ishikawa (JP)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,142

(22) Filed: Feb. 28, 2013

(65) Prior Publication Data

US 2013/0176969 A1 Jul. 11, 2013

Related U.S. Application Data

(63) Continuation of application No. 13/333,805, filed on Dec. 21, 2011, now Pat. No. 8,411,557, which is a continuation of application No. 12/293,530, filed as application No. PCT/JP2007/055695 on Mar. 20, 2007, now Pat. No. 8,139,473.

(30) Foreign Application Priority Data

Mar. 20, 2006 (JP) .................................. 2006-076995

(51) Int. Cl.
H04J 11/00 (2006.01)
H04B 7/216 (2006.01)

(52) U.S. Cl.
USPC ............................ 370/208; 370/335; 370/342

(58) Field of Classification Search
USPC ........................ 370/208, 441, 342
See application file for complete search history.

(56) References Cited

U.S. PATENT DOCUMENTS 6,519,462 B1   2/2003   Lu et al.
6,859,445 B1   2/2005   Moon et al.
(Continued)

FOREIGN PATENT DOCUMENTS

CN   1381107 A     11/2002
WO   01/05050 A1   1/2001
(Continued)

OTHER PUBLICATIONS

Texas Instruments, "On Uplink Pilot in EUTRA SC-FDMA," R1-051062, Agenda Item: 8.2, 3GPP TSG RAN WG1 Ad Hoc on LTE, San Diego, USA, Oct. 10-14, 2005, 7 pages.

(Continued)

Primary Examiner — Andrew Lee
(74) Attorney, Agent, or Firm — Nixon & Vanderhye P.C.

(57) ABSTRACT

A mobile station apparatus includes a receiving unit configured to receive control information; a selecting unit configured to randomly select a sequence from a plurality of sequences contained in one group of a plurality of groups, into which a predetermined number of sequences generated from a plurality of base sequences are grouped and which are respectively associated with different amounts of data or reception qualities; and a transmitting unit for transmitting the selected sequence. The predetermined number of sequences are grouped by partitioning the predetermined number of sequences, in which sequences generated from the same base sequence and having different cyclic shifts are arranged in an increasing order of the cyclic shifts. A position at which the predetermined number of sequences are partitioned is determined based on the control information, and a number of sequences contained in each of the plurality of groups varies in accordance with the control information.

19 Claims, 11 Drawing Sheets

(56) References Cited

U.S. PATENT DOCUMENTS

| | | | |
|---|---|---|---|
| 2002/0041578 | A1 | 4/2002 | Kim et al. |
| 2006/0078051 | A1* | 4/2006 | Liang et al. ............... 375/240.24 |
| 2007/0047622 | A1* | 3/2007 | Stern ............................ 375/130 |
| 2007/0165567 | A1 | 7/2007 | Tan et al. |
| 2008/0070610 | A1 | 3/2008 | Nishio |
| 2008/0192678 | A1 | 8/2008 | Bertrand et al. |
| 2008/0212555 | A1* | 9/2008 | Kim et al. ..................... 370/344 |
| 2009/0003308 | A1* | 1/2009 | Baxley et al. ................. 370/350 |
| 2009/0109919 | A1* | 4/2009 | Bertrand et al. ............. 370/330 |
| 2009/0161650 | A1 | 6/2009 | Imamura et al. |
| 2010/0002573 | A1* | 1/2010 | Baldemair et al. ............ 370/210 |
| 2010/0278114 | A1 | 11/2010 | Kwon et al. |
| 2011/0007825 | A1 | 1/2011 | Hao et al. |
| 2011/0085515 | A1* | 4/2011 | Qu et al. ....................... 370/330 |
| 2011/0235529 | A1 | 9/2011 | Zetterberg et al. |
| 2011/0310940 | A1 | 12/2011 | Ozluturk |
| 2012/0002739 | A1* | 1/2012 | Peron ............................ 375/260 |
| 2012/0079330 | A1 | 3/2012 | Kawaguchi et al. |
| 2012/0087329 | A1 | 4/2012 | Imamura et al. |
| 2012/0189079 | A1* | 7/2012 | Taylor et al. .................. 375/295 |
| 2012/0275530 | A1* | 11/2012 | Nazar et al. ................... 375/267 |

FOREIGN PATENT DOCUMENTS

| | | |
|---|---|---|
| WO | 2005/122616 A1 | 12/2005 |
| WO | 2006/019710 A1 | 2/2006 |
| WO | 2007/108476 A1 | 9/2007 |

OTHER PUBLICATIONS

"3rd Generation Partnership Project; Technical Specification Group Radio Access Network; Physical layer procedures (FDD) (Release 6)," 3GPP TS 25.214 V6.7.1, Dec. 2005, 60 pages.

Chinese Office Action, for Chinese Application No. 200780010212.6, dated Jun. 11, 2010, 5 pages.

International Search Report, for International Application No. PCT/JP2007/055695, mailed Jun. 12, 2007, 2 pages.

Motorola, "RACH Design for EUTRA," R1-060025, Agenda Item: 5.2.3.1, 3GPP TSG RAN1#43, Helsinki, Finland, Jan. 23-25, 2006, 11 pages.

Motorola, "RACH Design for EUTRA," R1-060387, Agenda Item: 13.2.3.1, 3GPP TSG RAN1#44, Denver, CO, USA, Feb. 13-17, 2006, 13 pages.

Notice of the Reasons for Rejection, for Japanese Application No. 2010-265294, received Jan. 18, 2011, 5 pages.

NTT DoCoMo, NEC, Sharp, "Orthogonal Pilot Channel Structure in E-UTRA Uplink," R1-060046, Agenda Item: 5.2.2.2, 3GPP TSG-RAN WG1 LTE Ad Hoc Meeting, Helsinki, Finland, Jan. 23-25, 2006, 8 pages.

NTT DoCoMo, NEC, Sharp, "Random Access Transmission in E-UTRA Uplink," R1-060047, Agenda Item: 5.2.3.1, 3GPP TSG-RAN WG1 LTE Ad Hoc Meeting, Helsinki, Finland, Jan. 23-25, 2006, 8 pages.

NTT DoCoMo, Fujitsu, Mitsubishi Electric, NEC, Panasonic, Sharp, Toshiba Corporation, "Orthogonal Pilot Channel Structure for E-UTRA Uplink," R1-060319, Agenda Item: 13.2.2.2, 3GPP TSG RAN WG1 Meeting #44, Denver, CO, USA, Feb. 13-17, 2006, 7 pages.

Qualcomm Europe, "Principles of RACH," R1-060480, Agenda Item: 13.2.3.1, 3GPP TSG-RAN WG1 LTE, Denver, CO, USA, Feb. 13-17, 2006, 7 pages.

* cited by examiner

| RECEIVED QUALITY | CONTROL INFORMATION |
|---|---|
| SINR < −5dB | 000 |
| −5dB ≤ SINR < 0dB | 001 |
| 0dB ≤ SINR < 5dB | 010 |
| 5dB ≤ SINR < 10dB | 011 |
| 10dB ≤ SINR < 15dB | 100 |
| 15dB ≤ SINR < 20dB | 101 |
| 20dB ≤ SINR < 25dB | 110 |
| 25dB ≤ SINR | 111 |

FIG.3

| CONTROL INFORMATION | CAZAC SEQUENCE NUMBER: k | SHIFT: m | SIGNATURE NUMBER |
|---|---|---|---|
| 000 | #1 | 0 | #1 |
| | | 1 | #2 |
| | | ⋮ | ⋮ |
| | | 7 | #8 |
| 001 | #2 | 0 | #9 |
| | | 1 | #10 |
| | | ⋮ | ⋮ |
| | | 7 | #16 |
| 010 | #3 | 0 | #17 |
| | | 1 | #18 |
| | | ⋮ | ⋮ |
| | | 7 | #24 |
| 011 | #4 | 0 | #25 |
| | | 1 | #26 |
| | | ⋮ | ⋮ |
| | | 7 | #32 |
| 100 | #5 | 0 | #33 |
| | | 1 | #34 |
| | | ⋮ | ⋮ |
| | | 7 | #40 |
| 101 | #6 | 0 | #41 |
| | | 1 | #42 |
| | | ⋮ | ⋮ |
| | | 7 | #48 |
| 110 | #7 | 0 | #49 |
| | | 1 | #50 |
| | | ⋮ | ⋮ |
| | | 7 | #56 |
| 111 | #8 | 0 | #57 |
| | | 1 | #58 |
| | | ⋮ | ⋮ |
| | | 7 | #64 |

TABLE

FIG.4

| CONTROL INFORMATION | CAZAC SEQUENCE NUMBER: k | SHIFT: m |
|---|---|---|
| 000 | #1 | 0~7 |
| 001 | #2 | 0~7 |
| 010 | #3 | 0~7 |
| 011 | #4 | 0~7 |
| 100 | #5 | 0~7 |
| 101 | #6 | 0~7 |
| 110 | #7 | 0~7 |
| 111 | #8 | 0~7 |

TABLE

FIG.5

| CONTROL INFORMATION | CAZAC SEQUENCE NUMBER: k | SHIFT: m |
|---|---|---|
| 000 | #1 | 0~7 |
| 001 | | 8~15 |
| 010 | | 16~23 |
| 011 | | 24~31 |
| 100 | #2 | 0~7 |
| 101 | | 8~15 |
| 110 | | 16~23 |
| 111 | | 24~31 |

TABLE

FIG.8

| CONTROL INFORMATION | CAZAC SEQUENCE NUMBER: k | SHIFT: m | SIGNATURE NUMBER |
|---|---|---|---|
| 000 | #1 | 0 | #1 |
| | | 1 | #2 |
| | | 2 | #3 |
| | | 3 | #4 |
| | | 4 | #5 |
| | | 5 | #6 |
| | | 6 | #7 |
| | | 7 | #8 |
| | #2 | 0 | #9 |
| | | 1 | #10 |
| | | 2 | #11 |
| | | 3 | #12 |
| | | 4 | #13 |
| | | 5 | #14 |
| | | 6 | #15 |
| | | 7 | #16 |
| 001 | #3 | 0 | #17 |
| | | 1 | #18 |
| | | 2 | #19 |
| | | 3 | #20 |
| | | 4 | #21 |
| | | 5 | #22 |
| | | 6 | #23 |
| | | 7 | #24 |
| ⋮ | ⋮ | ⋮ | ⋮ |
| 101 | #8 | 0 | #57 |
| | | 1 | #58 |
| | | 2 | #59 |
| | | 3 | #60 |
| | | 4 | #61 |
| 111 | | 5 | #62 |
| | | 6 | #63 |
| | | 7 | #64 |

TABLE

FIG.9

| CONTROL INFORMATION | CAZAC SEQUENCE NUMBER: k | SHIFT: m | SIGNATURE NUMBER |
|---|---|---|---|
| 000 | #1 | 0 | #1 |
| | | 1 | #2 |
| | | 2 | #3 |
| | | 3 | #4 |
| | | 4 | #5 |
| | | 5 | #6 |
| | | 6 | #7 |
| | | 7 | #8 |
| | #2 | 0 | #9 |
| | | 1 | #10 |
| | | 2 | #11 |
| | | 3 | #12 |
| | | 4 | #13 |
| | | 5 | #14 |
| | | 6 | #15 |
| | | 7 | #16 |
| 001 | #3 | 0 | #17 |
| | | 1 | #18 |
| | | 2 | #19 |
| | | 3 | #20 |
| | | 4 | #21 |
| | | 5 | #22 |
| | | 6 | #23 |
| | | 7 | #24 |
| ⋮ | ⋮ | ⋮ | ⋮ |
| 101 | #8 | 0 | #57 |
| | | 1 | #58 |
| | | 2 | #59 |
| | | 3 | #60 |
| | | 4 | #61 |
| | | 5 | #62 |
| 111 | | 6 | #63 |
| | | 7 | #64 |

{ TABLE }

INTEGRATED CIRCUIT FOR RANDOM ACCESS METHOD AND APPARATUS

TECHNICAL FIELD

The present invention relates to a radio communication mobile station apparatus and a radio communication method.

BACKGROUND ART

Presently, studies are underway to use RACH (Random Access Channel) for initial access from a radio communication mobile station apparatus (hereinafter simply "mobile station") to a radio communication base station apparatus (hereinafter simply "base station"), in 3GPP RAN LTE (Long Term Evolution) (see Non-Patent Document 1). The RACH is utilized, for example, to make an association request and a resource request to the base station, and in initial access upon acquiring uplink transmission timing synchronization.

A mobile station transmitting a RACH signal selects one of a plurality of unique signatures in the RACH and transmits the selected signature to the base station to distinguish itself from other mobile stations transmitting RACH signals.

Moreover, in the RACH, taking into account that a plurality of signatures are transmitted from a plurality of mobile stations at the same time, studies are underway to use code sequences having low cross-correlation and high autocorrelation as signatures so as to demultiplex and detect those signatures in the base station. As a code sequence having such characteristics, the CAZAC (Constant Amplitude Zero Auto-Correlation) sequence is known, which is one of GCL (Generalized Chirp-Like) sequences (see Non-Patent Document 2).

Furthermore, to reduce the processing delay after the initial access, studies are underway to report, in the RACH, control information including the mobile station ID, the reason for RACH transmission, bandwidth allocation request information (QoS information, the amount of data, and so on), and downlink received quality information (see Non-Patent Document 3).

Non-patent Document 1: 3GPP TSG-RAN WG1 LTE Ad Hoc Meeting, R1-060047, NTT DoCoMo, NEC, Sharp, "Random Access Transmission in E-UTRA Uplink," Helsinki, Finland, 23-25 Jan. 2006

Non-patent Document 2: 3GPP TSG-RAN WG1 LTE Ad Hoc Meeting, R1-060046, NTT DoCoMo, NEC, Sharp, "Orthogonal Pilot Channel Structure in E-UTRA Uplink," Helsinki, Finland, 23-25 Jan. 2006

Non-patent Document 3: 3GPP TSG-RAN WG1 LTE Ad Hoc Meeting, R1-060480, Qualcomm, "Principles of RACH," Denver, USA, 13-17 Feb. 2006

DISCLOSURE OF INVENTION

Problems to be Solved by the Invention

Various studies are presently conducted for a method for reporting control information in the RACH, and efficient reporting of control information in the RACH meets a strong demand.

It is therefore an object of the present invention to provide a mobile station and radio communication method for efficiently reporting control information in the RACH.

Means for Solving the Problem

The mobile station of the present invention adopts a configuration including: a selecting section that selects one code sequence from a base code sequence associated with control information to be reported and a plurality of derived code sequences derived from the associated base code sequence, or from a plurality of derived code sequences derived from the base code sequence associated with the control information to be reported; and a transmitting section that transmits the selected code sequence in a random access channel.

The radio transmission method of the present invention includes steps of: selecting one code sequence from a base code sequence associated with control information to be reported and a plurality of derived code sequences derived from the corresponding base code sequence, or from a plurality of derived code sequences derived from the base code sequence associated with the control information to be reported; and transmitting the selected code sequence in a random access channel.

Advantageous Effect of the Invention

The present invention provides an advantage of reporting control information efficiently in the RACH.

BRIEF DESCRIPTION OF DRAWINGS

FIG. 3 shows the control information according to Embodiment 1;

FIG. 4 is the reference table (table example 1) according to Embodiment 1;

FIG. 5 is the reference table (a simplified version of the reference table in FIG. 4) according to Embodiment 1;

FIG. 8 shows the reference table (table example 2) according to Embodiment 1;

FIG. 9 shows the reference table (table example 3) according to Embodiment 2;

FIG. 11 is the reference table (table example 4) according to Embodiment 3.

BEST MODE FOR CARRYING OUT THE INVENTION

Now, embodiments of the present invention will be described in detail with reference to the accompanying drawings.

Embodiment 1

Figure 1:
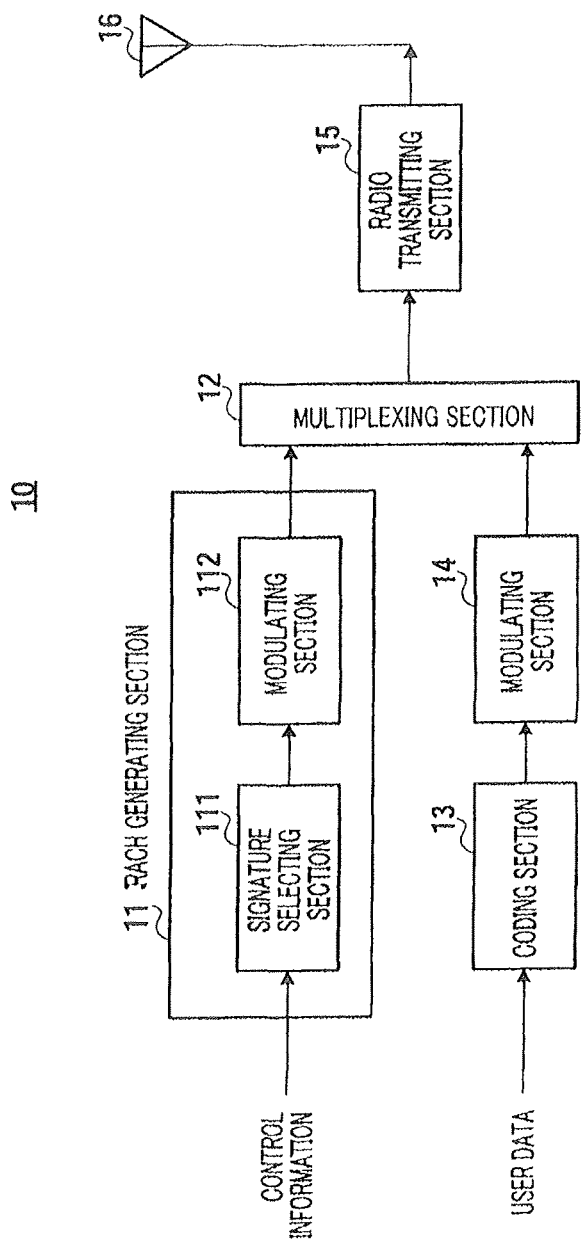
FIG. 1 is a block diagram showing the configuration of the mobile station according to Embodiment 1.

FIG. 1 shows the configuration of mobile station 10 of the present embodiment.

RACH generating section 11 is constructed of signature selecting section 111 and modulating section 112, and generates a RACH signal as follows.

Signature selecting section 111 selects one of a plurality of unique code sequences as a signature, according to inputted control information, and outputs the selected code sequence to modulating section 112.

The signature selection (code sequence selection) will be described later in detail.

Modulating section 112 modulates the signature (code sequence) to generate a RACH signal and outputs the RACH signal to multiplexing section 12.

On the other hand, encoding section 13 encodes user data and outputs the encoded user data to modulating section 14.

Modulating section 14 modulates the encoded user data and outputs the modulated user data to multiplexing section 12.

Multiplexing section 12 time-domain-multiplexes the RACH signal and the user data, and outputs the time-domain-multiplexed RACH signal and user data to radio transmitting section 15. That is, after the RACH signal transmission is completed, multiplexing section 12 outputs the user data to radio transmitting section 15.

Radio transmitting section 15 performs radio processing including up-conversion on the RACH signal and user data, and transmits the result to the base station via antenna 16.

Next, the signature selection (code sequence selection) will be described in detail.

In the present embodiment, GCL sequences or CAZAC sequences are used as signatures (code sequences).

GCL sequence $C_k(n)$ is given by equations 1 and 2. GCL sequence is a code sequence having high autocorrelation and low cross-correlation and having frequency response characteristics of constant amplitude. Here, N is an arbitrary integer and represents the sequence length. Moreover, k is an integer between 1 and N−1.

Further, n represents the n-th in the code sequence length N and is an integer between 0 and N−1. The GCL sequence found by equations 1 and 2 serves as the base code sequence.

(Equation 1)

$$C_k(n) = \alpha \cdot \exp\left(\frac{j2\pi k}{N}\left(\beta \cdot n + \frac{n(n+1)}{2}\right)\right) \quad [1]$$

where $N$ is an odd number (Equation 2)

$$C_k(n) = \alpha \cdot \exp\left(\frac{j2\pi k}{N}\left(\beta \cdot n + \frac{n^2}{2}\right)\right) \quad [2]$$

where $N$ is an even number

Here, to acquire a large number of GCL sequences of low cross-correlations, the sequence length N is preferably an odd number and a prime number. Then, if the sequence length N is an odd number, by cyclically shifting, according to equation 3, the base code sequence given by equation 1, a plurality of derived code sequences $C_{k,m}(n)$ of respective numbers of cyclic shifts, can be acquired from a base code sequence $C_k(n)$.

(Equation 3)

$$C_{k,m}(n) = \alpha \cdot \exp\left(\frac{j2\pi k}{N}\left(\beta \cdot (n+m\cdot\Delta)\bmod N + \frac{(n+m\cdot\Delta)\bmod N \cdot ((n+m\cdot\Delta)\bmod N +1)}{2}\right)\right) \quad [3]$$

Then, the GCL sequence where α and β are 1 in equations 1 to 3 is a CAZAC sequence, and the CAZAC sequences are code sequences of the lowest cross-correlation among GCL sequences. That is, the base code sequence of CAZAC sequence $C_k(n)$ is found by equations 4 and 5. When the code sequence length N is an odd number, by cyclically shifting, according to equation 6, the base code sequence found by equation 4, with CAZAC sequences similar to GCL sequences, a plurality of derived code sequences $C_{k,m}(n)$ of respective numbers of cyclic shifts can be acquired from a base code sequence $C_k(n)$.

(Equation 4)

$$C_k(n) = \exp\left(\frac{j2\pi k}{N}\left(n + \frac{n(n+1)}{2}\right)\right) \quad [4]$$

where $N$ is an odd number (Equation 5)

$$C_k(n) = \exp\left(\frac{j2\pi k}{N}\left(n + \frac{n^2}{2}\right)\right) \quad [5]$$

where $N$ is an even number (Equation 6)

$$C_{k,m}(n) = \exp\left(\frac{j2\pi k}{N}\left((n+m\cdot\Delta)\bmod N + \frac{(n+m\cdot\Delta)\bmod N \cdot ((n+m\cdot\Delta)\bmod N +1)}{2}\right)\right) \quad [6]$$

Although an example of cases will be explained below where the CAZAC sequence is used as a signature (code sequence), it is obvious from the above explanation that the present invention is also implemented when the GCL sequence is used as a signature (a code sequence).

Figure 2:
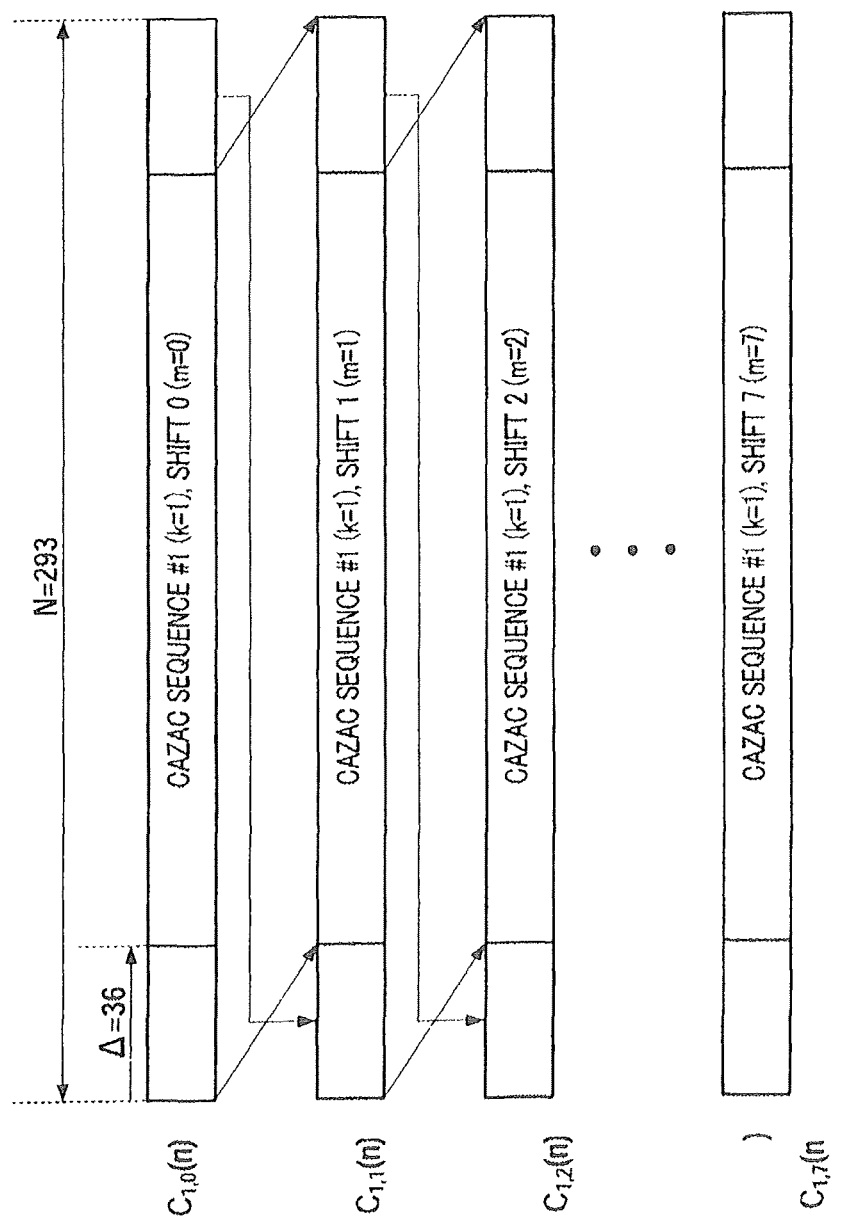
FIG. 2 illustrates the CAZAC sequences according to Embodiment 1.

FIG. 2 shows, in CAZAC sequences, eight derived code sequences $C_{1,0}(n)$ to $C_{1,7}(n)$ of the numbers of cyclic shifts m=0 to 7 (i.e., shift 0 to 7) that can be generated from a single base code sequence (CAZAC sequence #1), given that the sequence length N is 293, the cyclic shift value Δ is 36 and k is 1. If k is 2 or greater, equally, eight derived code sequences may be generated from a single base code sequence. That is, if CAZAC sequences #1 to #8 are used as the base code sequences, sixty four code sequences in total can be utilized as signatures. A base code sequence and a derived code sequence where the shift is zero are the same. Moreover, the cyclic shift value Δ needs to be set greater than the maximum propagation delay time of signatures. This results from occurring error detection of signatures in the base station, if a plurality of mobile stations transmit a plurality of signatures at the same time and delay waves are received with delays beyond the cyclic shift value Δ, the base station is unable to decide whether it received signature with large delay time or it received signatures of different cyclic shift values. This maximum propagation delay time depends on the cell radius, that is, the distance of the maximum propagation path between the mobile station and the base station.

In the present embodiment, the base code sequences and derived code sequences acquired as such associated with control information are used as the signatures.

Signature selecting section 111 receives received quality information as, for example, control information shown in FIG. 3. Pieces of control information "000" to "111" are associated with received quality (i.e., SINRs) shown in FIG. 3, respectively, and one of pieces of the control information "000" to "111" is inputted to signature selecting section 111 as the control information to be reported.

Signature selecting section 111, which has the table shown in FIG. 4, selects one of the signatures (code sequences) with reference to the table shown in FIG. 4 based on the inputted control information to be reported.

In this table, as shown in FIG. 4, control information "000" to "111" are provided in association with CAZAC sequences #1 to #8, which are the base code sequences. Furthermore, for each CAZAC sequence #1 to #8, control information "000" to "111" are provided in association with derived code sequences of shifts 0 to 7 derived from each CAZAC sequence #1 to #8. FIG. 5 shows a simplified version of the table shown in FIG. 4.

In the table shown in FIG. 4, for example, the control information "000" is provided in association with CAZAC sequence #1 and derived code sequences of shifts 0 to 7 derived from CAZAC sequence #1. The derived code sequences of shifts 0 to 7 of CAZAC sequence #1 correspond to signatures #1 to #8, respectively. Moreover, control information "001" is provided in association with CAZAC sequence #2 and derived code sequences of shifts 0 to 7 derived from CAZAC sequence #2. The derived code sequences of shifts 0 to 7 of CAZAC sequence #2 correspond to signatures #9 to #16, respectively. The same applies to control information "010" to "111." That is, in the present embodiment, one piece of control information is associated with a single base code sequence and a plurality of unique derived code sequences derived from this single base code sequence. Moreover, the unique 64 code sequences are associated with signatures #1 to #64.

Then, when, for example, "000" is inputted as the control information to be reported, signature selecting section 111 selects one code sequence from code sequences of shifts 0 to 7 of CAZAC sequence #1 as the signature. The base code sequence and a derived code sequence of shift 0 are the same, so that signature selecting section 111 selects one code sequence as a signature from the base code sequence corresponding control information to be reported and a plurality of derived code sequences derived from the corresponding base code sequence, or from a plurality of derived code sequences derived from the base code sequence corresponding to the control information to be reported.

Consequently, according to the present embodiment, the mobile station utilizes signatures as control information upon reporting control information in the RACH, so that the mobile station does not need to transmit control information in addition to signatures.

Moreover, the base station that receives a signature can detect control information by detecting the signature at the same time. In this way, according to the present embodiment, control information can be reported efficiently in the RACH.

In the present embodiment, taking into account that a plurality of mobile stations transmit the identical control information at the same time, it is preferable that signature selecting section 111 selects one of the eight code sequences corresponding to the inputted control information on a random basis. For example, when the control information "000" is inputted, taking into account that a plurality of mobile stations report identical control information "000" at the same time, signature selecting section 111 preferably selects one of code sequences (signatures #1 to #8) of shifts #0 to #7 of CAZAC sequence #1 corresponding to the control information "000" on a random basis. Even when a plurality of mobile stations transmit the identical control information at the same time, this random selection reduces the likelihood of selecting the same code sequence between separate mobile stations, so that the base station is more likely to improve the likelihood of demultiplexing and detecting the signatures transmitted from the individual mobile stations.

Moreover, a configuration may also be employed where signature selecting section 111 may select the code sequence associated with the control information to be reported from the code sequences prepared in advance (here, 64 code sequences #1 to #64), or select the CAZAC sequence number k and the number of shifts m associated with the control information to be reported to generate a code sequence $C_{k,m}$ (n) from equation 6 every selection.

Whichever configuration is employed, as a result, signature selecting section 111 selects one of signatures (code sequences) based on control information to be reported.

Here, a plurality of derived code sequences derived from a single base code sequence are completely orthogonal, and the cross-correlation is zero between these derived code sequences.

On the other hand, although cross-correlation between a plurality of base code sequences is relatively low, these base code sequences are not completely orthogonal, and the cross-correlation is not zero. The same applies to derived code sequences derived from different code sequences.

That is, a plurality of derived code sequences derived from a single base code sequence have a feature of having a lower cross-correlation than the cross-correlation between a plurality of base code sequences and the cross-correlation between derived code sequences derived from different code sequences.

That is, in the table shown in FIG. 4, with CAZAC sequence #1 corresponding to control information "000" and CAZAC sequence #2 corresponding to control information "001," the cross-correlation between the code sequences of shifts 0 to 7 of CAZAC sequence #1 is lower than the cross-correlation between CAZAC sequence #1 and CAZAC sequence #2 and the cross-correlation between the code sequences of shifts 0 to 7 of CAZAC sequence #1 and the code sequences of shifts 0 to 7 of CAZAC sequence #2. That is, the cross-correlation between the identical control information can be lower than the cross-correlation between different control information by adopting the associations shown in FIG. 4.

Figure 6:
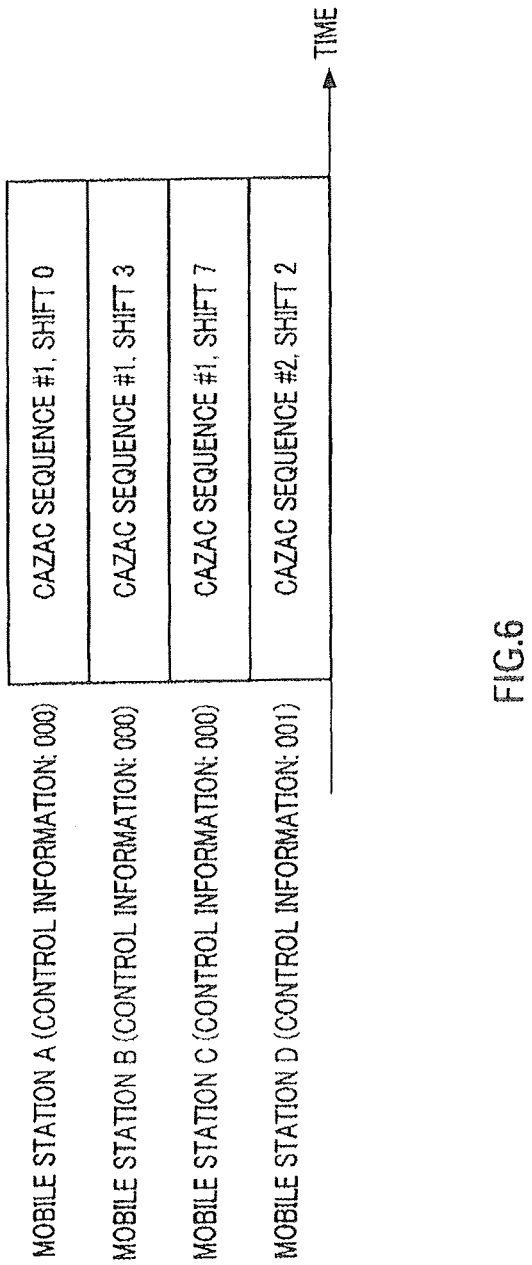
FIG. 6 shows an example of control information multiplexing according to Embodiment 1.

That is, as shown in FIG. 6, even when identical control information ("000") is reported at the same time from a plurality of mobile stations (mobile stations A to C) and a plurality of signatures are multiplexed in the RACH, if code sequences with unique numbers of shifts (shifts 0, 3 and 7) derived from the same base code sequence (CAZAC sequence #1) are multiplexed as signatures, intersymbol interference between the signatures is ideally zero, and the performance of demultiplexing and detecting signatures in the base station hardly degrades compared with a case where multiplexing is not performed, even when the number of multiplexing increases.

On the other hand, as shown in FIG. 6, when there is a mobile station (mobile station D) reporting different control information ("001"), code sequence (shift 2) derived from the different base code sequence (CAZAC sequence #2) is multiplexed as a signature, and so the performance of demultiplexing and detecting signatures in the base station degrades when the number of multiplexing increases.

That is, the present embodiment is effective particularly when the identical control information is reported from a plurality of mobile stations at the same time. The specific and identical control information is more likely to be reported from a plurality of mobile stations at the same time when the rate of occurrence of the pieces of control information is less uniform.

For example, in a situation where there is a train station in the cell and there are always a large number of mobile stations in a specific location in the cell, the mobile stations in this specific location are likely to have nearly uniform received quality, so that the specific and identical control information is likely to have a high rate of occurrence and are reported from a plurality of mobile stations at the same time.

Figure 7:
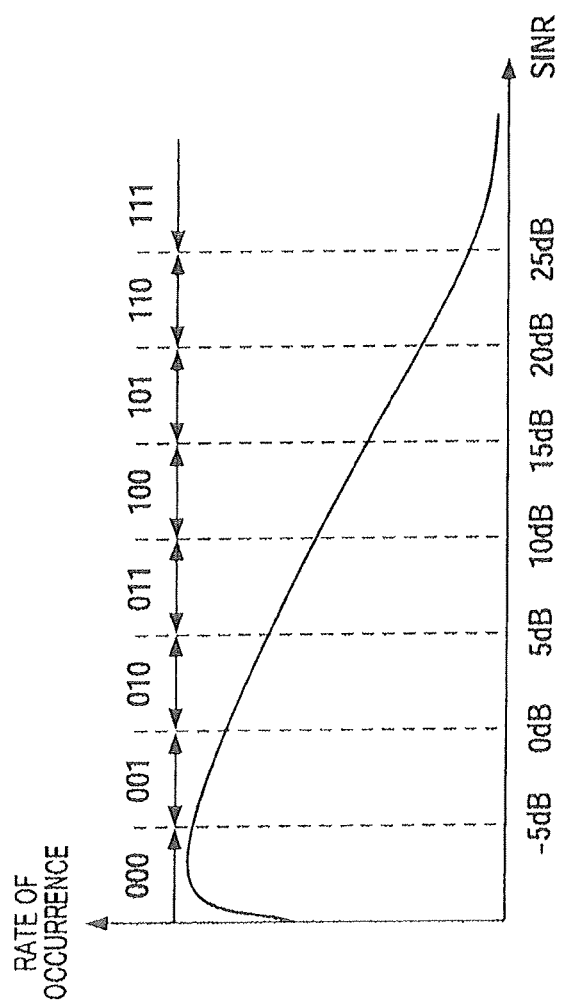
FIG. 7 shows the rate of occurrence of control information according to Embodiment 1.

Moreover, received quality in a mobile station increases closer to the center of a cell where the base station is located and gradually decreases farther from the center of the cell. Further, this area increases as farther from the center of the cell. Accordingly, in the situation where mobile stations are uniformly distributed in the cell, as shown in FIG. 7, it is possible that when the rate of occurrence is high at lower received quality (SINR), there are a large number of mobile stations reporting control information showing lower received quality (SINR). Accordingly, in the situation as such, for control information showing lower received quality, the identical control information is likely to be reported from a plurality of mobile stations at the same time.

That is, in this situation, the specific and identical control information is likely to be reported from a plurality of mobile stations at the same time.

In this way, according to the present embodiment, it is possible to keep the rate of detection of signatures and control information at the base station high, in the situation where there are a large number of mobile stations reporting the identical control information in the RACH.

When the cell radius is small, the table shown in FIG. 8 may be used instead of the table shown in FIG. 4. That is, the maximum propagation delay time of the signatures is small and the cyclic shift value Δ can be less when the cell radius is small, so that, to decrease the cross-correlation between different pieces of control information, as shown in FIG. 8, a plurality of pieces of control information may be associated with a single base code sequence. In the table shown in FIG. 8, control information "000" to "011" are associated with CAZAC sequence #1, and control information "000" is associated with the code sequence of shifts 0 to 7 of CAZAC sequence #1, control information "001" is associated with the code sequence of shifts 8 to 15 of CAZAC sequence #1, control information "010" is associated with the code sequence of shifts 16 to 23 of CAZAC sequence #1, and control information "011" is associated with the code sequence of shifts 24 to 31 of CAZAC sequence #1. Moreover, control information "100" to "111" are associated with CAZAC sequence #2, control information "100" is associated with the code sequence of shifts 0 to 7 of CAZAC sequence #2, control information "101" is associated with the code sequence of shifts 8 to 15 of CAZAC sequence #2, control information "110" is associated with the code sequence of shifts 16 to 23 of CAZAC sequence #2, and control information "111" is associated with the code sequence of shifts 24 to 31 of CAZAC sequence #2. These associations make it possible to associate different pieces of control information with derived code sequences of different shift values derived from a single base code sequence, so that it is possible to decrease the cross-correlation between different pieces of control information and keep the rate of detection of signatures and control information at the base station high even when there are a large number of mobile stations reporting the different control information at the same time.

Embodiment 2

As shown in FIG. 7 above, there are cases where the rate of occurrence is not uniform between control information in the cell. That is, in such a case, it is preferable to assign more code sequences to control information occurred much.

Now, the present embodiment does not employ tables (FIGS. 4, 5 and 8) that provide various pieces of control information in association with the same number of code sequences as in Embodiment 1. Instead, the present embodiment employs a table that associates control information of a higher rate of occurrence with more base code sequences or more derived code sequences, as shown in FIG. 9.

When control information of high rate of occurrence is reported from a plurality of mobile stations at the same time, use of this table reduces the rate of transmitting the same code sequences from a plurality of mobile stations, so that it is possible to reduce the rate of collisions between code sequences and to keep the rate of detection of signatures and control information at the base station high.

Moreover, at this time, when one piece of control information is provided in association with a plurality of base code sequences, to keep the cross-correlation between the identical control information low, it is preferable to associate derived code sequences derived from a single base code sequence preferentially. For example, when one piece of control information like control information "000" in FIG. 9 is provided in association with CAZAC sequences #1 and #2, control information "000" is preferentially associated with all derived code sequences derived from CAZAC sequence #1 and, the rest of the piece is associated with part of the derived code sequences derived from CAZAC sequence #2. That is, in the table shown in FIG. 9, one piece of control information is provided in association with a plurality of base code sequences and all of the derived code sequences derived from at least one of a plurality of the base code sequences.

Moreover, although a case has been described above with the present embodiment where the number of code sequences assigned to each control information is determined according to the rate of occurrence of each control information, the number of code sequences assigned to each control information is determined according to, for example, the significance, priority, the number of retransmissions, and QoS of each control information. That is, the present embodiment employs the table that provides the pieces of control information in association with different numbers of base code sequences or different numbers of derived code sequences.

Embodiment 3

The rate of occurrence of control information changes in a cell. For example, at a single place in a cell, there are a number of mobile stations in daytime larger than in nighttime, and the rate of occurrence for the specific and identical control information is higher in daytime than nighttime in such a case.

Then, according to the present embodiment, the number of base code sequences or the number of derived code sequences associated with pieces of control information change according to changes of the rate of occurrence of control information.

Figure 10:
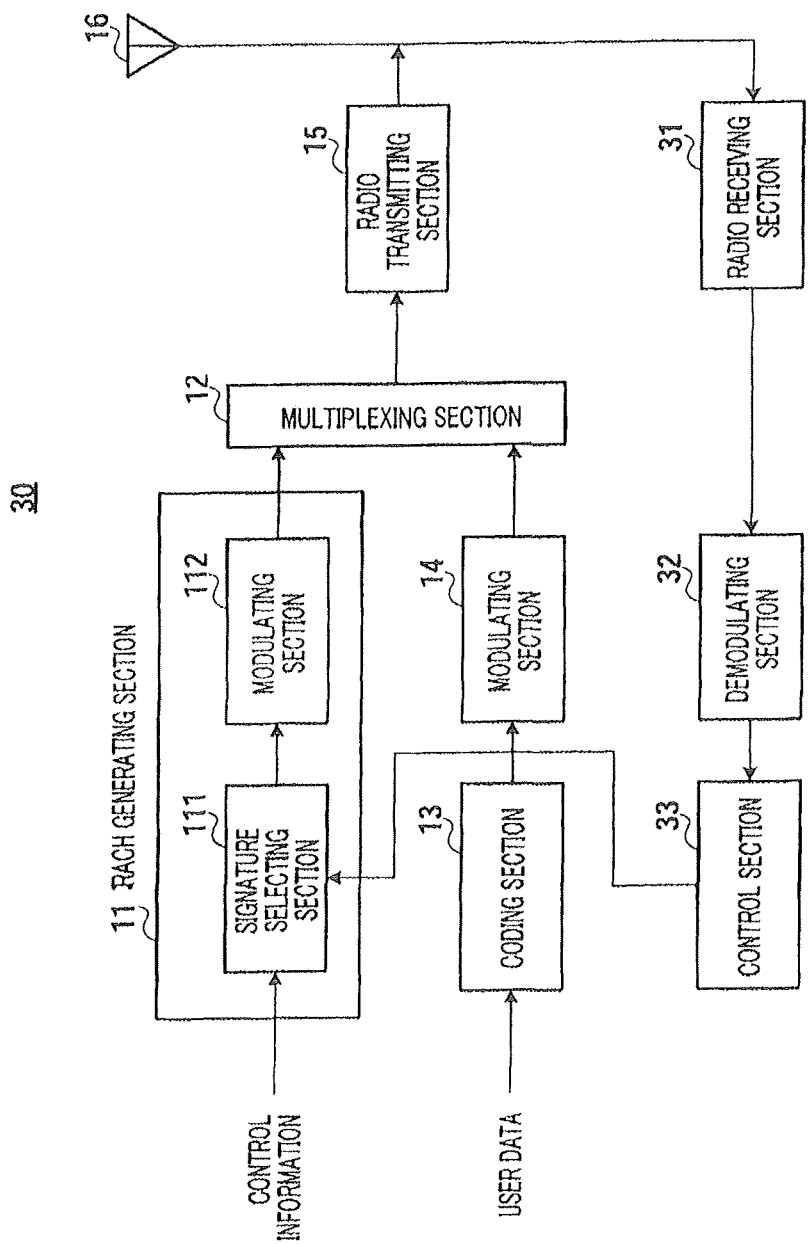
FIG. 10 is a block diagram showing the configuration of the mobile station according to Embodiment 3.

FIG. 10 shows the configuration of mobile station 30 according to the present embodiment. In FIG. 10, the same reference numerals will be assigned to the same component in FIG. 1 (Embodiment 1), and description thereof will be omitted.

Radio receiving section 31 receives control signal transmitted from the base station via antenna 16, performs radio processing including down-conversion of the control signal, and outputs the control signal to demodulating section 32. This control signal is transmitted in the broadcast control channel from the base station and designates to change the associations between control information and the code sequences in the table according to the rate of occurrence of control information. The rate of occurrence of control information is measured in the base station receiving signatures.

Demodulating section 32 demodulates the control signal and outputs the demodulated control signal to control section 33.

Control section 33 changes the associations in the table provided in the signature selecting section 111 according to the control signal. For example, control section 33 changes the associations in the table shown in FIG. 9 above as shown in FIG. 11. FIG. 11 shows a case where the number of code sequences associated with control information "000" is increased due to an increased rate of occurrence of control information "000" and where the number of code sequences associated with control information "001" is decreased due to a decreased rate of occurrence of control information "001."

In this way, according to the present embodiment, the number of code sequences associated with each control information is changed according to changes of rate of occurrence of control information, so that it is possible to keep the rate of detection of signatures and control information at the base station high even when the rate of occurrence of control information is changed.

The embodiments of the present invention have been explained.

Although cases have been explained above with the embodiments where signature selecting section 111 adopts the configuration of the tables above, the tables above may also be adopted outside of signature selecting section 111. Moreover, the tables are not particularly required if the control information and the code sequence are associated in different manners.

Moreover, in the embodiments, although GCL sequence and CAZAC sequence are explained as an example of code sequences, any code sequence may be used if levels of cross-correlations vary between the code sequences.

Moreover, control information reported from the mobile station is not limited to received quality information. Other control information includes, for example, a mobile station ID, a reason of RACH transmission, bandwidth allocation request information (Qos information and an amount of data and so on), RACH transmission power, and difference between the maximum value of RACH transmission power and present transmission power.

Moreover, the mobiles station and the base station according to the embodiments may be referred to as "UE" and "Node-B."

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-076995, filed on Mar. 20, 2006, including the specification, drawings and abstract, is incorporated herein by reference in its entirety.

INDUSTRIAL APPLICABILITY

The present invention is suitable for use in transmission of uplink common channels including a RACH.

The invention claimed is:

1. An integrated circuit for controlling a process comprising:

receiving control information;

grouping a predetermined number of sequences that are generated from a plurality of base sequences into a plurality of groups, which are respectively associated with different amounts of data or reception qualities, by partitioning the predetermined number of sequences, in which sequences generated from the same base sequence and having different cyclic shifts are arranged in an increasing order of the cyclic shifts; and randomly selecting a sequence from a plurality of sequences contained in one group of the plurality of groups, wherein a position at which the predetermined number of sequences are partitioned is determined based on the control information, and a number of sequences contained in each of the plurality of groups varies in accordance with the control information.

2. The integrated circuit according to claim 1, the process further comprises transmitting the selected sequence.

3. The integrated circuit according to claim 2, wherein the selected sequence is transmitted on a random access channel.

4. The integrated circuit according to claim 1, wherein the number of sequences contained in each of the plurality of groups is different.

5. The integrated circuit according to claim 1, wherein the predetermined number of sequences are grouped by partitioning the predetermined number of sequences, which are arranged in an increasing order of sequence indices of the base sequences.

6. The integrated circuit according to claim 1, wherein one group associated with one of the different amounts of data or reception qualities is comprised of all of sequences that are generated from at least one of the base sequences.

7. The integrated circuit according to claim 1, wherein one group associated with one of the different amounts of data or reception qualities is comprised only of sequences that are generated from at least one of the base sequences.

8. The integrated circuit according to claim 1, wherein a group associated with the amount of data or reception quality with higher probability of occurrence is comprised of a greater number of sequences.

9. The integrated circuit according to claim 1, wherein the number of the sequences contained in each of the plurality of groups varies in accordance with probability of occurrence of the amount of data or reception quality.

10. The integrated circuit according to claim 1, wherein the base sequence is a Generalized Chirp-like (GCL) sequence.

11. A process implemented using a integrated circuit comprising:

receiving control information;

grouping a predetermined number of sequences that are generated from a plurality of base sequences into a plurality of groups, which are respectively associated with different amounts of data or reception qualities, by partitioning the predetermined number of sequences, in which sequences generated from the same base sequence and having different cyclic shifts are arranged in an increasing order of the cyclic shifts; and randomly selecting a sequence from a plurality of sequences contained in one group of the plurality of groups, wherein a position at which the predetermined number of sequences are partitioned is determined based on the control information, and a number of sequences contained in each of the plurality of groups varies in accordance with the control information.

12. The integrated circuit according to claim 11, the process further comprises transmitting the selected sequence on a random access channel.

13. The integrated circuit according to claim 11, wherein the number of sequences contained in each of the plurality of groups is different.

14. The integrated circuit according to claim 11, wherein the predetermined number of sequences are grouped by partitioning the predetermined number of sequences, which are arranged in an increasing order of sequence indices of the base sequences.

15. The integrated circuit according to claim 11, wherein one group associated with one of the different amounts of data or reception qualities is comprised of all of sequences that are generated from at least one of the base sequences.

16. The integrated circuit according to claim 11, wherein one group associated with one of the different amounts of data or reception qualities is comprised only of sequences that are generated from at least one of the base sequences.

17. The integrated circuit according to claim 11, wherein a group associated with the amount of data or reception quality with higher probability of occurrence is comprised of a greater number of sequences.

18. The integrated circuit according to claim 11, wherein the number of the sequences contained in each of the plurality of groups varies in accordance with probability of occurrence of the amount of data or reception quality.

19. Integrated circuitry comprising:

a receiver configured to receive control information;

data processing circuitry configured to:

group a predetermined number of sequences that are generated from a plurality of base sequences into a plurality of groups, which are respectively associated with different amounts of data or reception qualities, by partitioning the predetermined number of sequences, in which sequences generated from the same base sequence and having different cyclic shifts are arranged in an increasing order of the cyclic shifts; and randomly select a sequence from a plurality of sequences contained in one group of the plurality of groups, wherein a position at which the predetermined number of sequences are partitioned is determined based on the control information, and a number of sequences contained in each of the plurality of groups varies in accordance with the control information.

* * * * *